No. 877,882.

PATENTED JAN. 28, 1908.

G. J. BLUM.
LATHE DOG.
APPLICATION FILED JUNE 13, 1904.

Witnesses:

Inventor:
George J. Blum
By Luther L. Miller
Atty.

UNITED STATES PATENT OFFICE.

GEORGE J. BLUM, OF CHICAGO, ILLINOIS.

LATHE-DOG.

No. 877,882.     Specification of Letters Patent.     Patented Jan. 28, 1908.

Application filed June 13, 1904. Serial No. 212,352.

*To all whom it may concern:*

Be it known that I, GEORGE J. BLUM, a citizen of the United States, residing at Chicago, in the county of Cook and State of Illinois, have invented certain new and useful Improvements in Lathe-Dogs, of which the following is a specification.

In lathe dogs as heretofore constructed, the jaws are moved relatively to each other by means of tightening screws passing through suitable openings in said jaws near opposite ends thereof, the openings in one of said jaws being screw-threaded to receive said screws. In the construction just outlined, when a tapering shaft or similar object is held between the jaws of the dog, and the screws tightly set, one or both of said screws are likely to be bent by the tilting of the jaws to assume an angle corresponding with that of the surface of the object held between them. Also, if one screw is tightened more than the other, so that the parallel relation of the jaws is disturbed, said screws will be bent. The bending of the tightening screws interferes with the free action of the dog by making the screws very difficult to turn, and successive bendings weakens them so that they finally will break.

The object of this invention is to overcome the objections hereinbefore mentioned, by the production of a lathe dog, the tightening screws of which have a universal movement with relation to the jaws, thus permitting said jaws to be inclined, either transversely or in the direction of their length, without subjecting said screws to strains other than in the direction of their length.

Figure 1:
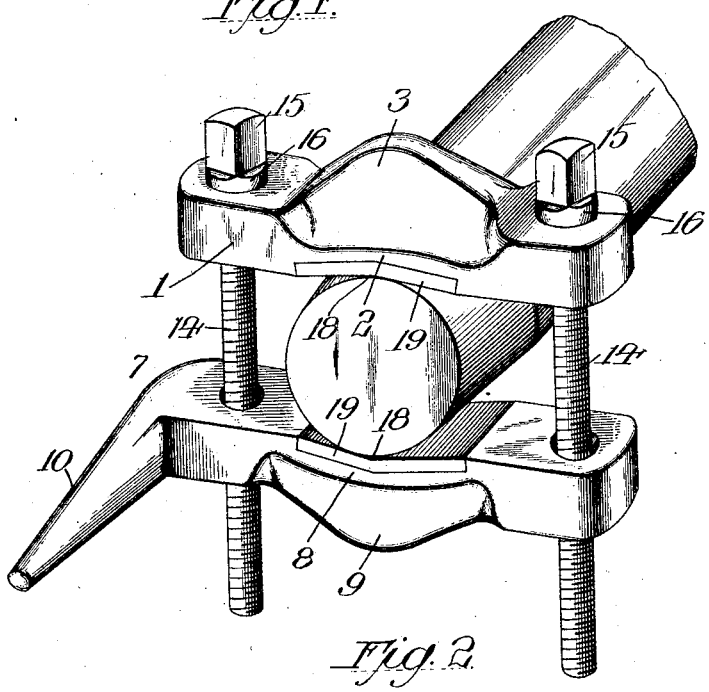
Figure 2:
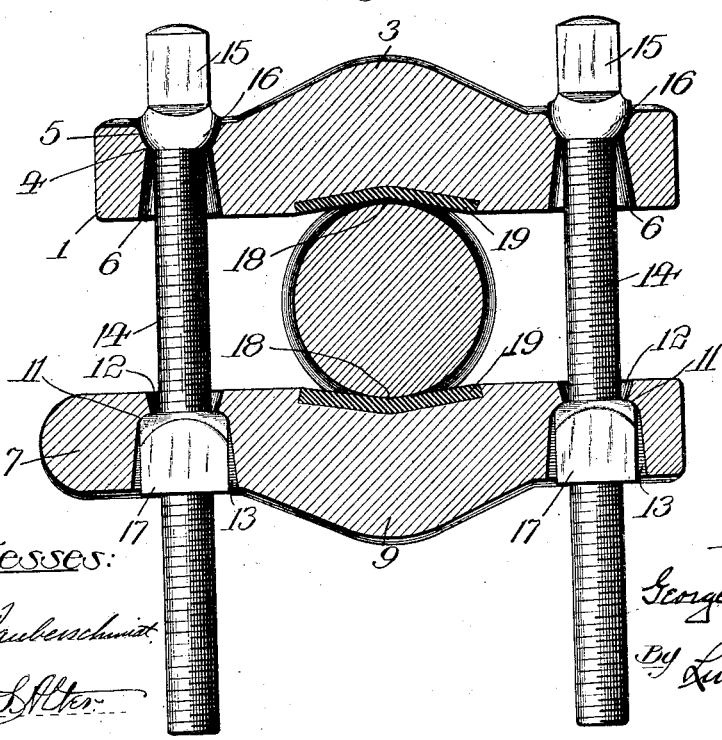

In the accompanying drawings, Figure 1 is a perspective view of a lathe dog embodying the features of my invention, the dog being represented as clamping a tapered object. Fig. 2 is a vertical central section through said lathe dog.

In the embodiment of this invention I provide a head jaw 1 having a holding face 2 and an integral strengthening web 3 rearwardly of said face. Near its ends the head jaw is provided with openings 4 extending therethrough, the outer ends of said openings being in the form of outwardly opening sockets 5, while the inner ends of the openings are bell-mouth or flaring, as at 6.

The tail jaw 7 corresponds substantially in general outline with the head jaw 1, having a grasping face 8 and an integral strengthening web 9, and is also provided with an integral tail or stem 10 of the usual form. Near its ends and coinciding with the openings 4 in the head jaw said tail jaw is provided with openings 11 having flaring inner end portions 12 and rectangular outer pockets 13, the inner ends of which rectangular pockets are of cup or socket form.

Holding screws 14 are adapted to extend through the openings 4 and 11 of the two holding jaws 1 and 7. The heads 15 of said screws are squared at their upper ends to receive a wrench, while the lower portions 16 of said heads are spherical or ball-shape to correspond with the sockets 5 of the outer ends of the openings 4 in the head jaw 1. Nuts 17 are screw-threaded to fit upon the screws 14, the upper ends of said nuts being hemispherical in form to correspond with the cupped inner ends of the pockets 13.

The adjacent or holding faces of the holding jaws 1 and 7 are notched, as at 18, in the usual manner, and in this instance are provided with facings 19 of brass or other suitable metal, set into the faces of said holding jaws.

In operation, this improved lathe dog is placed upon the work in the usual manner, and when the screws 1 and 7 are tightened and the jaws brought firmly in contact with the surface of the object between them said jaws are at liberty to move with relation to said screws, either tilting longitudinally if one screw is tightened more than the other, or oscillating transversely if the object grasped is tapering or irregular in outline. The openings 4 and 11 through which the tightening screws 7 extend are in their smallest diameters somewhat greater than the diameter of the screws, and the flaring inner ends of both openings 4 and 11 permit said screws to have a considerable movement with relation to said jaws. This movement between the jaws and the screws is carried at the upper ends of the screws upon the spherical portions 16 of said screws bearing in the sockets 5 in the outer portions of the openings 4, and between the nuts 17 and the tail jaw 7 by the ball-shape inner end of each of the nuts bearing in the cupped or socket end of the rectangular pockets 13.

It is apparent that various changes may be made in the embodiment herein shown of this invention without departing from the spirit and scope of the invention, wherefore I desire to have it understood that I do not limit myself to the particular construction herein illustrated and described.

I claim as my invention:

In a lathe dog, in combination, two holding jaws, each of said jaws having an opening extending therethrough at each of its ends, the outer end of each of said openings being of socket form and the inner end thereof flaring; screws connecting the corresponding ends of said jaws, the head of each of said screws being rounded to correspond with one of said sockets; and a nut on each of said screws having a rounded portion adapted to fit into the corresponding socket of the other jaw, said last mentioned socket being outwardly flaring and deep enough to contain substantially the entire nut and corresponding substantially in horizontal cross-section with the form of said nut, whereby said nut is free to oscillate in any direction in said socket but is held from turning on its axis.

GEORGE J. BLUM.

Witnesses:
L. L. MILLER,
GEORGE L. CHINDAHL.